(12) United States Patent
Jeon

(10) Patent No.: US 8,533,328 B2
(45) Date of Patent: Sep. 10, 2013

(54) METHOD AND SYSTEM OF DETERMINING VULNERABILITY OF WEB APPLICATION

(75) Inventor: Sang Hun Jeon, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 800 days.

(21) Appl. No.: 12/135,267

(22) Filed: Jun. 9, 2008

(65) Prior Publication Data

US 2009/0119777 A1    May 7, 2009

(30) Foreign Application Priority Data

Feb. 22, 2008  (KR) .................. 10-2008-0016046

(51) Int. Cl.
*G06F 12/14*    (2006.01)
*G06F 15/173*   (2006.01)

(52) U.S. Cl.
USPC ............. 709/225; 709/224; 709/229; 726/23; 726/25

(58) Field of Classification Search
USPC ....................... 709/224–225, 229; 726/23, 25
See application file for complete search history.

(56) References Cited

U.S. PATENT DOCUMENTS

| | | | |
|---|---|---|---|
| 6,584,569 B2 * | 6/2003 | Reshef et al. .................... | 726/25 |
| 7,343,626 B1 * | 3/2008 | Gallagher ........................ | 726/25 |
| 2006/0117006 A1 * | 6/2006 | Howard et al. .................. | 707/6 |
| 2007/0208822 A1 * | 9/2007 | Wang et al. ..................... | 709/217 |

FOREIGN PATENT DOCUMENTS

JP    2006099460 A  *  4/2006

OTHER PUBLICATIONS

Elias Levy et al., Interface Illusions, IEEE Security & Privacy, Volume, Issue 6, Nov.-Dec. 2004, pp. 66-69.*
Dimitris Gavrilis et al., Flash crowd detection using decoy hyperlinks, Proceeding of 2007 IEEE International Conference on Networking, Sensing and Control, Apr. 2007, London, p. 466-70.*
IBM, IBM Rational App Scan, Sep. 1, 2004, retrieved from [http://www-01.ibm.com/software/awdtools/appscan/].*
Bernardo Damele, SQLMAP project change log, Dec. 2006, SorceForge.net, retrieved from [http://sqlmap.sourceforge.net/doc/ChangeLog].*

* cited by examiner

*Primary Examiner* — Patrice Winder
(74) *Attorney, Agent, or Firm* — H.C. Park & Associates, PLC

(57) ABSTRACT

A method of determining vulnerability of web application comprises: selecting fixed parameters from parameters of URL link extracted from a website; determining whether a process of determining vulnerability for the selected fixed parameter is completed or not; inserting an attack pattern for each attack type to an input value for the selected fixed parameter, when the process of determining vulnerability for the selected fixed parameter is not completed; and determining vulnerability of the selected fixed parameter by each attack type through an analysis of response to an input of URL link with the attack pattern inserted thereinto.

20 Claims, 6 Drawing Sheets

METHOD AND SYSTEM OF DETERMINING VULNERABILITY OF WEB APPLICATION

CROSS-REFERENCE TO RELATED APPLICATION

This application claims the benefit of Korean Patent Application No. 10-2008-0016046, filed on Feb. 22, 2008, which is hereby incorporated by reference as if fully set forth herein.

TECHNICAL FIELD

The present invention relates to a web security, and more particularly, to a method and system of determining vulnerability of web application.

BACKGROUND ART

With recent communication technology development and widespread Internet use, various kinds of services that had been provided only off-line have been applied on-line. For supporting such on-line services, a service provider provides "Web Application" to service users, wherein "Web Application" functions as a gateway. However, if information which is input or output through the use of "Web Application", and more particularly, confidential information such as the service users' financial information leaks to malicious web users, it may cause huge financial damages to the service users.

The current trends in computer-security hacking are that so-called black-hat hackers (malicious or criminal hackers) attempt to attack "Web Application" corresponding to the gateway which accesses the service users' information. In case of "Web Application" built without consideration for the security, it can be easily attacked by the black-hat hackers who exploit the information of service users.

"A Guide to Building Secure Web Applications", published by OWASP (Open Web Application Security Project), discloses examples of attack types, that is, "SQL Injection", "Cook Spoofing and Injection", "File Upload and Download", "Parameter Manipulation" and "XSS (Cross-Site Scripting)". Among the aforementioned attack types against "Web Application", "SQL Injection" and "XSS" are the most problematic, recently.

"SQL Injection" means an attack technique which obtains or exploits unauthorized information by mutating SQL query through input of an abnormal SQL command in a user authorization window or URL (Uniform Resource Locator) address-input window. If "SQL Injection" occurs, it may cause an abnormal pass of user authorization, an unauthorized viewing of data stored in database, or an unexpected operation of system through the use of a system command in the database.

In case of "XSS", when users view a dynamically generated webpage with a malicious script injected thereinto by an attacker, the malicious script injected to the webpage is executed so that the attacker exploits other users' data. If "XSS" occurs, it may cause the user's cookie information leakage or the execution of malicious codes in the user's terminal.

To protect "Web Application" against the various attack types, there is a requirement to exclude the intrusion of attack types from each of parameters included in corresponding URLs. Ahead of the exclusion of the intrusion of attack types, a process of determining vulnerability to each attack type in all parameters included in each URL becomes more necessary.

However, even though each URL includes the same parameters, the process of determining vulnerability is applied to all parameters included in each URL, thereby wasting too much time to determine the vulnerability. In addition, if the process of determining vulnerability is repeatedly applied to the same URL or parameter, it causes redundant checks of determining vulnerability. Especially, in case of a large-scaled portal website, these problems become more serious.

The above information disclosed in this Background Art section is only for enhancement of understanding of the background of the invention and therefore it may contain information that does not form the prior art that is already known in this country to a person of ordinary skill in the art.

SUMMARY OF THE DISCLOSURE

Therefore, the present invention has been made in view of the above problems, and it is an object of the present invention to provide a method and system of determining vulnerability of web application, which is capable of applying a process of determining vulnerability to parameters selected from a URL.

It is another object of the present invention to provide a method and system of determining vulnerability of web application, which can prevent a redundancy check for a URL link for which a process of determining vulnerability is completed.

To achieve these objects and other advantages and in accordance with the purpose of the invention, as embodied and broadly described herein, the present invention, in one aspect, provides a method of determining vulnerability of web application comprising: selecting a fixed parameter from parameters of a URL link extracted from a website; determining whether vulnerability determination has been completed for the selected fixed parameter; inserting an attack pattern for each attack type to an input value for the selected fixed parameter, when the vulnerability determination has not been completed; and determining vulnerability of the selected fixed parameter by each attack type through an analysis of response to an input of URL link with the attack pattern inserted thereinto.

In another aspect, the present invention provides recording media readable by a computer with a program stored thereon to execute the method.

In still another aspect, the present invention provides a system of determining vulnerability of web application, which comprises: a fixed parameter selecting unit to select a fixed parameter from parameters of URL link extracted from a website; a redundancy determining unit to determine whether vulnerability determination has been completed for the selected fixed parameter; an attack-pattern inserting unit to insert an attack pattern for each attack type to an input value for the fixed parameter, when the vulnerability determination has not been completed; and a vulnerability determining unit to determine the vulnerability of the selected fixed parameter through an analysis of response to an input of URL link with the attack pattern inserted thereinto.

The above and additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
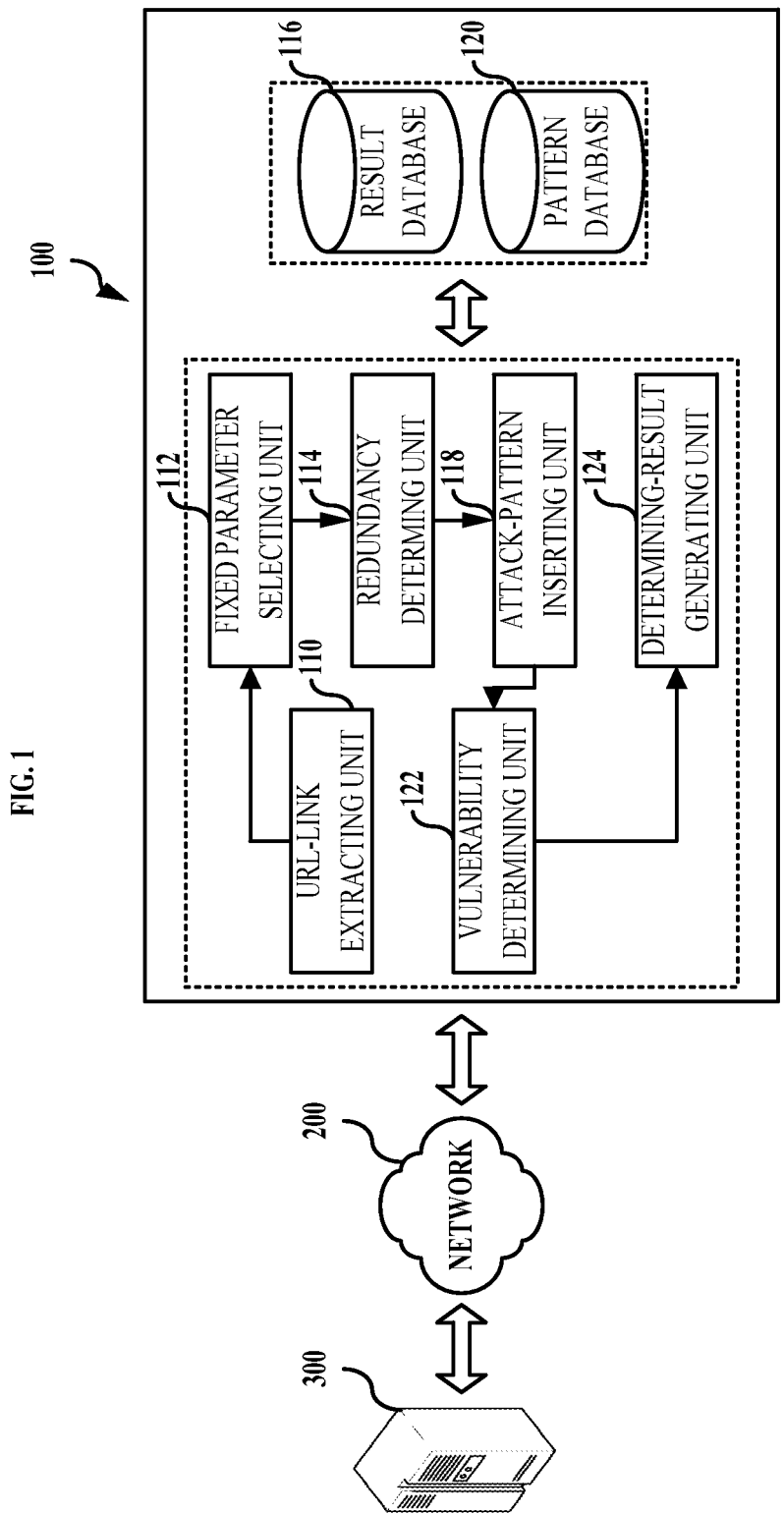
FIG. 1 is a block diagram illustrating a system of determining vulnerability of web application according to one embodiment of the present invention.

FIG. 1 is a block diagram illustrating a system of determining vulnerability of web application according to one embodiment of the present invention. As shown in FIG. 1, the system 100 of determining vulnerability of web application is connected to each web server 300 through a network 200, to thereby determine vulnerability of web application provided by each web server 300.

The system 100 includes a URL-link extracting unit 110, a fixed parameter selecting unit 112, a redundancy determining unit 114, an attack-pattern inserting unit 118, a vulnerability determining unit 122, and a determining-result generating unit 124.

The URL-link extracting unit 110 accesses the web server 300 through the use of URL of the website to which vulnerability determination is to be made; and extracts a URL link from the website. Then, the URL-link extracting unit 110 provides the extracted URL link to the fixed parameter selecting unit 112.

In this case, the URL-link extracting unit 110 may, preferably, extract all URL links from a main page of the website. Also preferably, among all URL links extracted from the main page of the website, the URL links including an external URL address that is not a URL address of the website may be excluded.

Alternatively, URL links included in a website subject to vulnerability determination may be provided from a device other than the URL-link extracting unit 110. That is, this URL-link extracting unit 110 may be selectively included in the system 100.

The fixed parameter selecting unit 112 then selects fixed parameter(s) from the URL link provided from the URL-link extracting unit 110. The URL link includes both fixed parameter(s) generated by the web application and variable parameter(s) that can be inputted for the fixed parameter(s). For example, the fixed parameter selecting unit 112 may select, as a fixed parameter, a parameter positioned just to the left of a parameter classification mark such as "=". That is, in case of the URL link "www.xxx.com/vuln.asp?idx=1&cd=1234", "idx" and "cd", which are positioned just to the left of "=", are selected as fixed parameters.

Selecting the fixed parameter(s) from the URL link can reduce the time for vulnerability determination. More specifically, most of the URL links have different variable parameters for a certain fixed parameter. That is, vulnerability determination can be performed for any one of such URL links, thereby decreasing the time for vulnerability determination.

The redundancy determining unit 114 determines whether vulnerability determination has been completed for the selected fixed parameter. As will be detailed below, the fixed parameter for which vulnerability determination has been completed by the vulnerability determining unit 122, is mapped to the corresponding URL, and the mapping result is stored in a first table (not shown) of a result database 116. Based on the first table, the redundancy determining unit 114 determines whether vulnerability determination has been completed for the selected fixed parameter.

When it is determined that vulnerability determination has been completed for the selected fixed parameter, the redundancy determining unit 114 iterates the redundancy check for any additional fixed parameter included in the same URL link.

On the other hand, when it is determined that vulnerability determination has not been completed for the selected fixed parameter, the redundancy determining unit 114 transmits the determination result to the attack-pattern inserting unit 118.

The attack-pattern inserting unit 118 inserts an attack pattern preset for each attack type into the input value for the fixed parameter for which vulnerability determination has not been completed. In this case, the attack pattern for each attack type may be obtained, preferably, from a pattern database 120 for storing the attack patterns based on the respective attack types.

The attack type may include at least one of SQL Injection, Blind SQL Injection and XSS (Cross-Site Scripting, hereinafter, referred to as 'XSS').

As mentioned above, "SQL Injection" means an attack technique which exploits unauthorized information by mutating SQL query through the input of abnormal SQL command in a user authorization window or URL address-input window. In case of "XSS", when users view a dynamically generated webpage with a malicious script injected thereinto by an attacker, the malicious script injected to the webpage is executed so that the attacker exploits other users' data. In the meantime, "Blind SQL Injection" is used to bypass a defense against "SQL Injection", that is, "Blind SQL Injection" is more maliciously cunning and intellectual than "SQL Injection".

In order to determine the vulnerability to the attack type of "SQL Injection" or "Blind SQL Injection", the attack-pattern inserting unit 118 can insert the attack pattern, for example, a single-quotation mark "'", a double dash "--" or a special character such as "#" into the input value for the fixed parameter. For example, if the URL link is "www.target.com/vuln.asp?idx=1&cd=1234", and the selected fixed parameter is "cd", "'" is inserted into "1234" corresponding to the input value for the fixed parameter "cd", whereby the URL link is changed into "www.xxx.com/vuln.asp?idx=1&cd=1234'".

That is, according as the attack pattern such as "'" is inserted into the input value for the fixed parameter, the URL link including this attack pattern inserted thereinto is provided to the web server, whereby the web server generates an error message. Meanwhile, the attack-pattern inserting unit 118 can insert the attack pattern made of a special character such as "<" or ">" or the attack pattern such as "+onmouseover=alert(test)+", so as to determine the vulnerability to the attack type "XSS".

The vulnerability determining unit 122 provides the URL link with the attack pattern inserted thereinto by the attack-pattern inserting unit 118 to the web server 300; and determines the vulnerability of fixed parameter to each attack type included in the URL link through an analysis of the response received from the web server 300.

Suitably, the vulnerability determining unit 122 can determine the vulnerability of the fixed parameter(s) included in the corresponding URL link through the analysis of HTTP response to the input of URL link with the attack pattern inserted thereinto. For this, HTTP response patterns, which can be displayed when the fixed parameter(s) is/are vulnerable to each attack type, are pre-stored in the pattern database 120 by each attack type. The vulnerability determining unit 122 can determine whether the HTTP response pattern to the input of URL link with the attack pattern inserted thereinto is the same as one of those stored in the pattern database 120 or not. If it is the same as one of those, it is determined that the fixed parameter is vulnerable to the corresponding attack type.

Figure 2A:
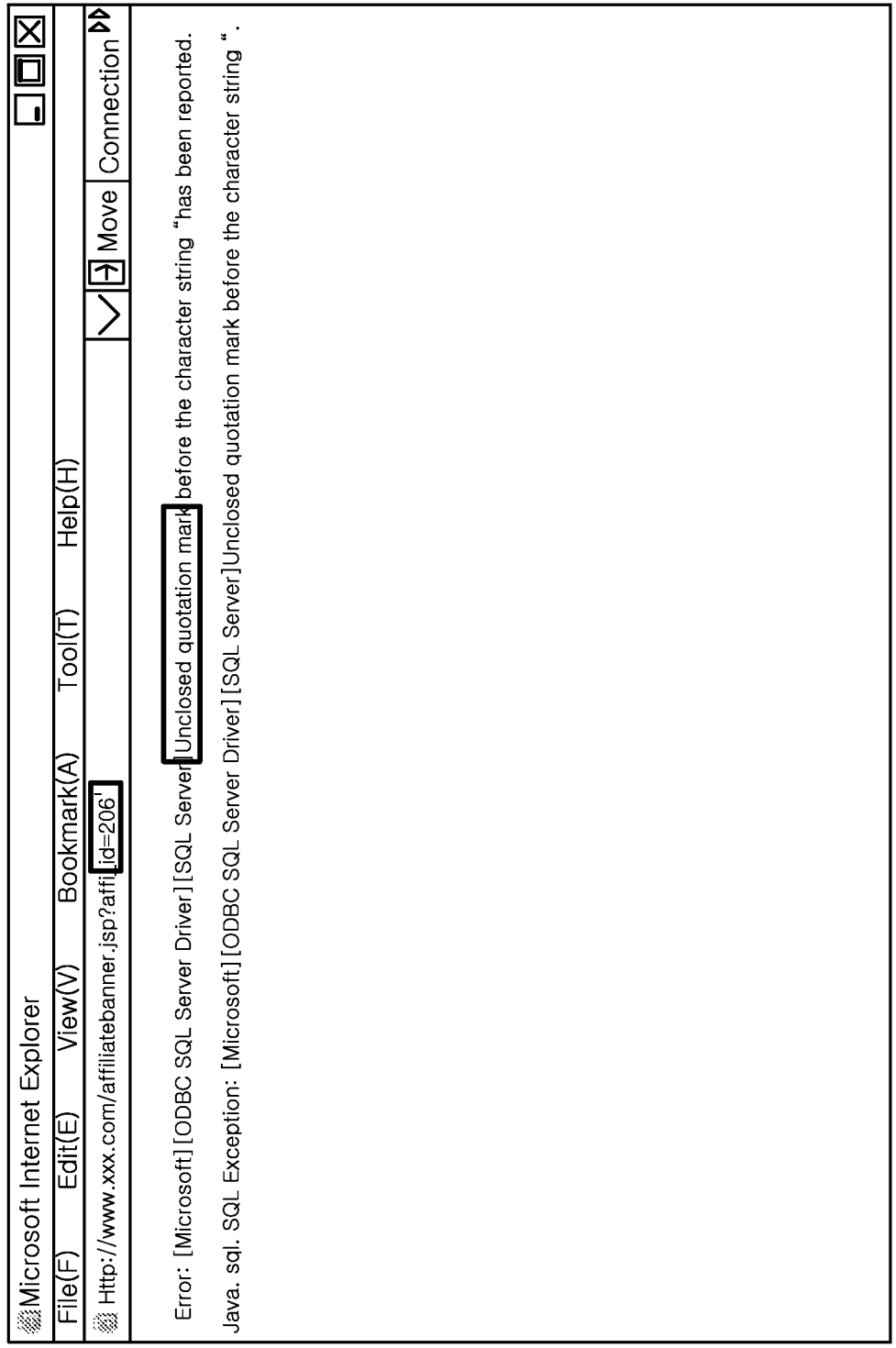
FIGS. 2A and 2B are diagrams illustrating a response pattern which is vulnerable to an attack type of SQL Injection.
Figure 2B:
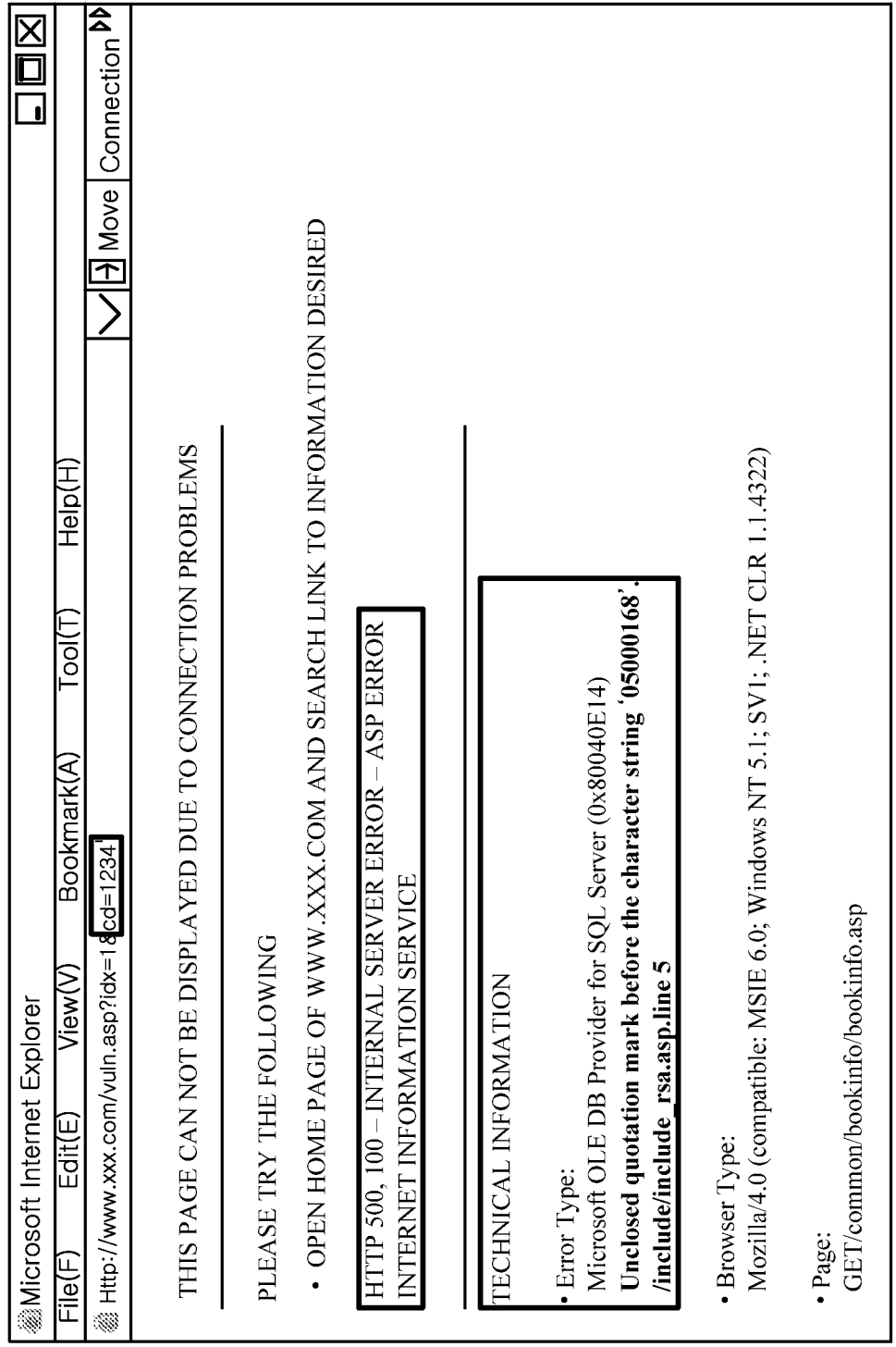

Supposing that the HTTP response pattern such as "HTTP 500 Error", "Unclosed quotation mark" or "ADODB.Command", which frequently occurs when the vulnerability is present by the attack type of SQL Injection or Blind SQL Injection, is stored in the pattern database 120. In this case, the HTTP response to the URL link of "www.xxx.com/affiliate-banner.jsp?affi_id=206'" with the attack pattern "'" inserted thereinto includes "Unclosed quotation mark" as shown in FIG. 2A, or the HTTP response to the URL link of "www.xxx.com/vuln.asp?idx=1&cd=1234'" with the attack pattern "'" inserted thereinto includes "HTTP 500 Error" as shown in FIG. 2B, whereby it is determined that the fixed parameters "id" and "cd" included in the URL link are vulnerable to the attack type of SQL Injection or Blind SQL Injection.

Figure 3:
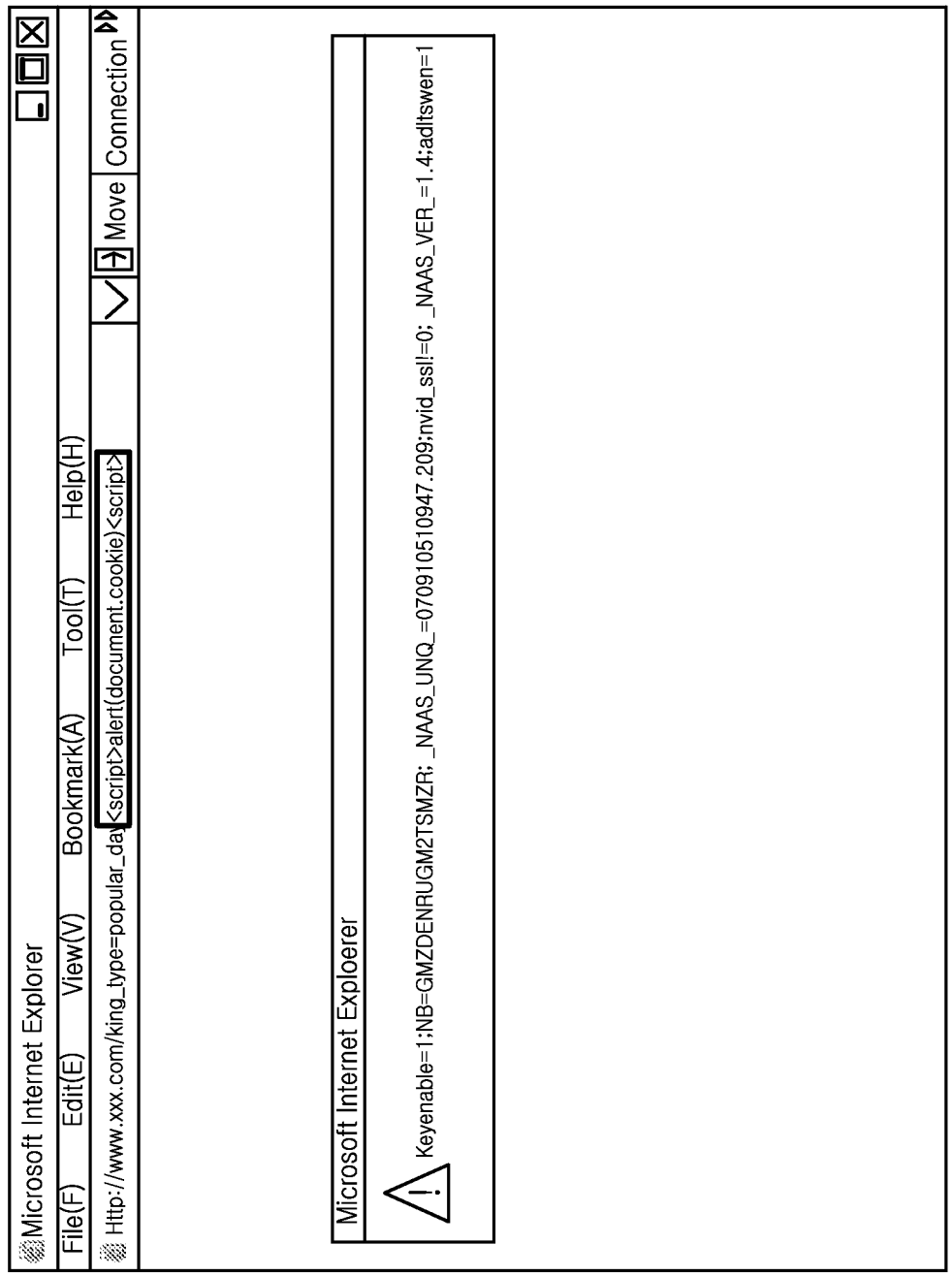
FIG. 3 is a diagram illustrating a response pattern which is vulnerable to an attack type of XSS.

As shown in FIG. 3, in case of XSS attack type, when the script is automatically executed by the HTTP response to the URL link into which the attack pattern of "<script>alert (document.cookie)</script>" is inserted, it is determined that the corresponding URL link is vulnerable to XSS attack type.

For the URL links transmitted to the web server for vulnerability determination, the vulnerability determining unit 122 maps the fixed parameter(s) included in the corresponding URL link to the URL address and then stores the mapping result in the first table of result database 116. As discussed above, the first table may be used for the determination of redundancy in the corresponding fixed parameter by the redundancy determining unit 114.

When the vulnerability determining unit 122 determines that the fixed parameter is vulnerable to a predetermined attack type, the fixed parameter is mapped to the corresponding URL address by each attack type to which the fixed parameter is vulnerable, and the mapping result is then stored in a second table (not shown) of result database 116. The determining-result generating unit 124 may generate a determination result and provide it to a service provider.

The result database 116 includes the first table and the second table. In case of the first table, fixed parameters for which vulnerability determination has been completed are mapped to the corresponding URL addresses. Meanwhile, in case of the second table, fixed parameters are mapped to the URL address including the fixed parameters with respect to attack type. Also, the HTTP response patterns for displaying the attack pattern for each attack type and the vulnerability to each attack type are stored in the pattern database 118.

Although vulnerability determination can be made, as described above, for all fixed parameters included in the extracted URL links, a URL-link list can be generated, as detailed below, so that vulnerability determination may be performed for only the fixed parameters included in the URL links of the URL-link list.

For this, the system 100 of determining vulnerability of web application may include a URL-link list generating unit (not shown). The URL-Link list generating unit generates the URL-link list through the use of URL links extracted by the URL-link extracting unit 110. In more detail, the URL-link list generating unit records the initially extracted URL links in the URL-link list, and records newly extracted URL links only if the fixed parameters thereof are different from those of the initially extracted URL links recorded in the URL-link list, to thereby prevent vulnerability determination from being performed for all of the URL links having different variable parameters for a certain fixed parameter. In this case, the redundancy determining unit 114 executes the redundancy check only for the fixed parameters included in the URL links recorded in the URL-link list.

Figure 4:
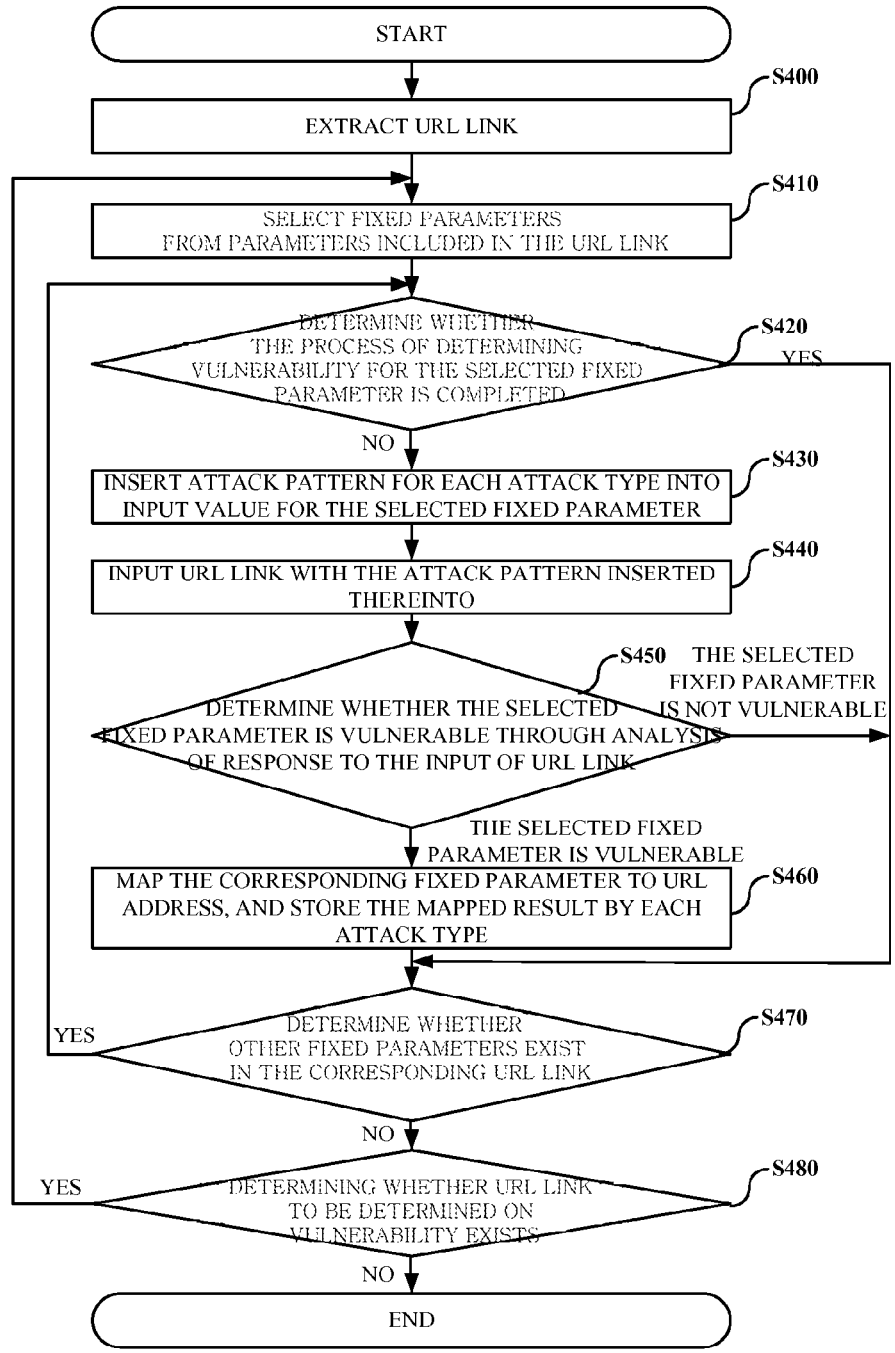
FIG. 4 is a flow chart illustrating a method of determining vulnerability of web application according to one embodiment of the present invention.

FIG. 4 is a flow chart illustrating a method of determining vulnerability of web application according to one embodiment of the present invention.

First, the system 100 accesses a website to which vulnerability determination is to be performed, and extracts all URL links from the main webpage of the website (S400). In this case, when extracting the URL links from the main webpage, the URL links including an external URL address may be excluded. URL links included in a website may be provided from an external device. That is, the process of extracting the URL links can be performed selectively.

Next, fixed parameters are selected from the parameters included in the extracted URL links (S410). The URL links include both fixed parameters generated by the web application and variable parameters corresponding to the input value for the fixed parameters. For instance, a parameter positioned just to the left of a parameter classification mark such as "=" is selected as a fixed parameter.

As mentioned above, fixed parameters are selected from the URL links in order to reduce the time for vulnerability determination.

Then, it is determined whether vulnerability determination has been completed for the selected fixed parameter (S420). Preferably, this determination may be performed by using the first table of result database 116 in which the fixed parameter for which vulnerability determination has been completed is mapped to the corresponding URL address. That is, when a fixed parameter is included in the first table of result database 116, it is determined that vulnerability determination of the fixed parameter has been completed.

On the other hand, when it is determined that vulnerability determination of the fixed parameter has not been completed, the attack pattern for each attack type is inserted into the input value for the selected fixed parameter (S430).

The attack type includes at least any one of SQL Injection, Blind SQL Injection and XSS (Cross-Site Scripting, hereinafter, referred to as 'XSS').

On insertion of the attack pattern for each attack type, the attack pattern, for example, a single-quotation mark "'", a double dash "--" or a special character such as "#" can be inserted into the input value for the fixed parameter so as to determine the vulnerability to the attack type of "SQL Injection" or "Blind SQL Injection", or the attack pattern made of the special character such as "<" or ">" or the attack pattern such as "+onmouseover=alter(test)+" can be inserted into the input value for the fixed parameter so as to determine the vulnerability to the attack type of "XSS".

After that, the URL link with the attack pattern inserted thereinto is transmitted to the web server (S440). Through the analysis of the response of the web server to the input of the corresponding URL link, it is determined whether the corresponding fixed parameter is vulnerable (S450). In this case, when transmitting to the web server the URL link with the attack pattern inserted thereinto, the fixed parameter included in the corresponding URL link for the URL link transmitted to the web server is mapped to the corresponding URL, and is then recorded in the first table of result database 116.

Suitably, during the process of analyzing the response, it may be determined that the HTTP response pattern to the input of the URL link with the attack pattern inserted thereinto is included in the HTTP response patterns stored in the pattern database 120. If it is included in the HTTP response patterns stored in the pattern database 120, it is determined that the corresponding fixed parameter is vulnerable to the corresponding attack type.

For example, if the HTTP response to the URL link with the attack pattern inserted thereinto for the determination of vulnerability to the attack type such as "SQL Injection" or "Blind SQL Injection" includes "HTTP 500 Error" as shown in FIG. 2, or the script is automatically executed by the HTTP response to the URL link with the attack pattern inserted thereinto for the determination of vulnerability to the attack type such as "XSS" as shown in FIG. 3, it is determined that the corresponding URL link is vulnerable to the aforementioned attack types, that is, "SQL Injection" "Blind SQL Injection" or "XSS".

In the step of S450, if it is determined that the corresponding fixed parameter is vulnerable to a specific attack type, the corresponding fixed parameter is mapped to the URL address including the corresponding fixed parameter, and the mapping result based on the attack type to which corresponding fixed parameter is vulnerable is recorded in the second table of result database 116 (S460).

After that, it is determined whether the corresponding URL link includes an additional fixed parameter (S470). If it includes, the steps from S420 to S460 are performed for the additional fixed parameter. If it does not include, it is determined whether there is an additional URL link (S480). If there is, the steps from S410 to S470 are performed for the additional URL link. Meanwhile, if there is not, vulnerability determination of web application is finished.

In the step of S420, when it is determined that vulnerability determination has been completed for the selected fixed parameter, it is determined whether the corresponding URL link includes an additional fixed parameter (S470). When it includes, the steps from S420 to S460 are performed for the additional fixed parameter. When it does not include, it is determined whether there is an additional URL link (S480). When there is, the steps from S410 to S470 are performed for the additional URL link. Meanwhile, when there is not, vulnerability determination of web application is finished.

Figure 5:
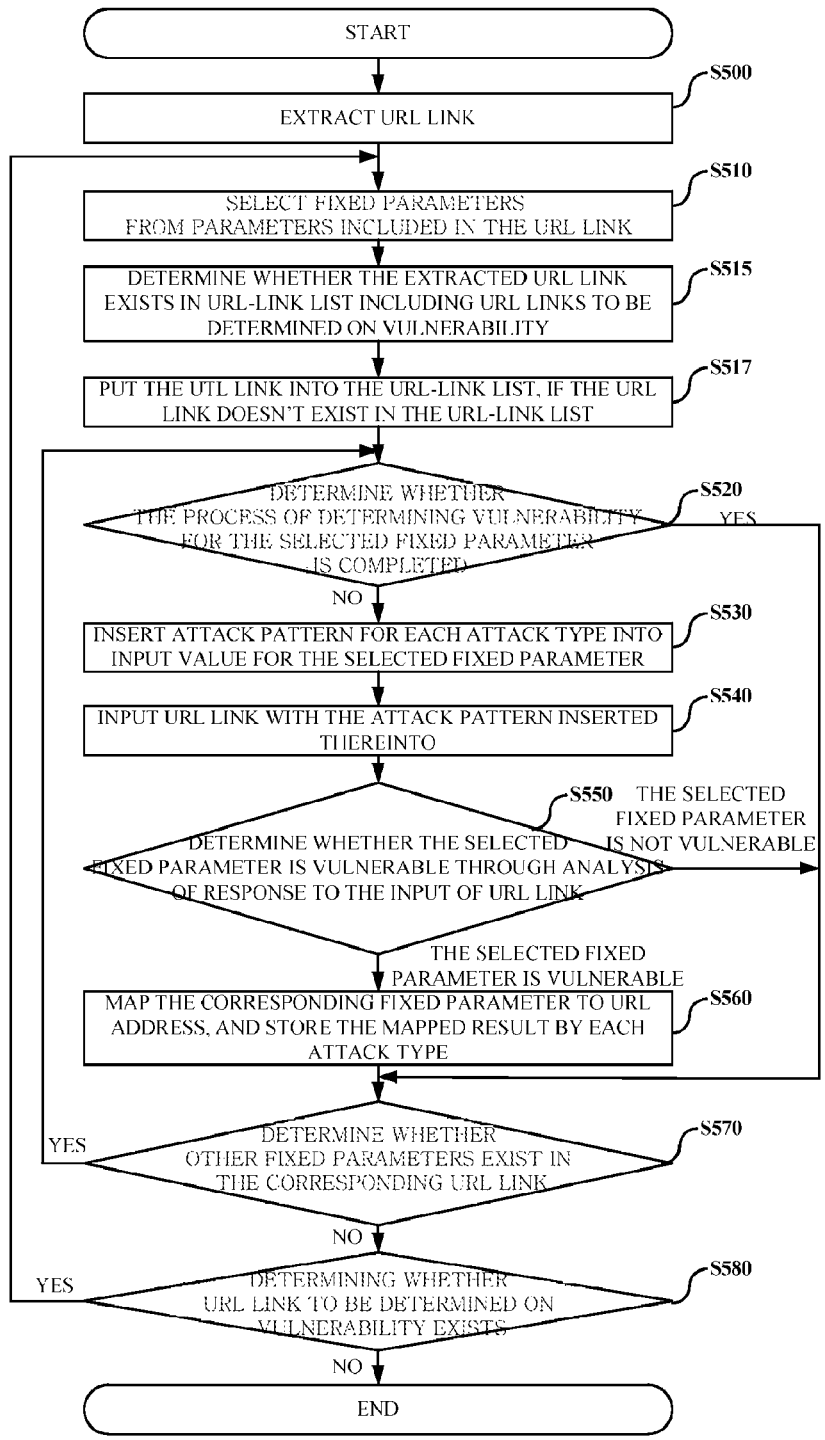
FIG. 5 is a flow chart illustrating a method of determining vulnerability of web application according to another embodiment of the present invention.

Alternatively, as discussed above, a URL-link list can be used during the step of extracting the URL links, as illustrated in FIG. 5.

First, all URL links included in the main webpage of a website are extracted (S500). Then, fixed parameters are selected from the parameters included in the extracted URL link (S510). For example, a parameter positioned just to the left of a parameter classification mark such as "=" is selected as a fixed parameter.

After that, it is determined whether the extracted URL link exists in the URL-link list (S515). When it is determined that the extracted URL link doesn't exist in the URL-link list, the extracted URL link is added to the URL-link list (S517). In this case, when URL links have different variable parameters for a particular fixed parameter, it is determined that they are identical. As a result, vulnerability determination can be performed for any one of the URL links having different variable parameters for a fixed parameter, thereby reducing the time for vulnerability determination.

Next, it is determined whether vulnerability determination has been completed for the fixed parameter of the URL link recorded in the URL-link list (S520). The determination can be performed by using the first table of result database. As such, the method illustrated in FIG. 5 includes two steps for selecting the URL links having the same fixed parameter are performed so as to reduce the time for vulnerability determination.

Steps of S530 to S580 are identical with the steps of S430 to S480 explained with reference to FIG. 4. Thus, the detailed explanation for the steps of S530 to S580 will be omitted.

The aforementioned methods of determining vulnerability of web application can be realized in a computer-readable program. That is, the program can be stored in recording media readable by computers, such as hard-disc, CD-ROM, DVD, ROM, RAM or flash memory.

As mentioned above, the methods and systems according to the present invention can reduce the time for vulnerability determination by performing vulnerability determination to any one of the URL links having different variable parameters for a fixed parameter and/or by not performing vulnerability determination to the URL links for which vulnerability determination has been completed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method that utilizes a processor to determine vulnerability of web application comprising:
   selecting a fixed parameter from parameters of a URL link extracted from a website;
   determining whether vulnerability determination has been completed for the selected fixed parameter;
   if the vulnerability determination has not been completed, inserting an attack pattern for each attack type to an input value for the selected fixed parameter; and
   determining, using the processor, vulnerability of the selected fixed parameter by each attack type through an analysis of response to an input of the URL link with the attack pattern inserted thereinto,
   wherein vulnerability determination comprises determining vulnerability of the selected fixed parameter by each attack type through an analysis of a response to an input of the URL link with the attack pattern inserted into the URL link.

2. The method according to claim 1, further comprising extracting the URL link from a main webpage of the website, before selecting the fixed parameter.

3. The method according to claim 1, wherein the fixed parameter is defined as the parameter positioned at the left of a parameter classification mark included in the URL link.

4. The method according to claim 1, wherein the attack pattern is extracted from a first database for storing the attack pattern by each attack type.

5. The method according to claim 1, wherein the attack pattern for each attack type is formed in type of characters.

6. The method according to claim 1, wherein the attack type includes at least one of SQL Injection, Blind SQL Injection and XSS (Cross-Site Scripting).

7. The method according to claim 1, further comprising mapping the fixed parameter to URL address of the website by each attack type and generating the mapping result, when it is determined that the fixed parameter is vulnerable to a specific attack type.

8. The method according to claim 1, wherein the vulnerability of the selected fixed parameter is determined based on the comparison of pre-stored result pattern and HTTP response pattern to the input of URL link with the attack pattern inserted thereinto.

9. The method according to claim 1, further comprising storing information of the URL links for which vulnerability determination has been completed.

10. The method according to claim 1, further comprising generating a URL-link list through the use of the extracted URL link, wherein it is determined whether vulnerability determination has been completed for the fixed parameter included in the URL link recorded in the URL-link list.

11. The method according to claim 10, wherein a URL list is recorded in the URL-link list only if the URL list and the URL links already recorded in the URL-link list have different fixed parameters.

12. One or more non-transitory computer readable recording media having stored thereon a computer program that, when executed by one or more processors, causes the one or more processors to perform a method, the method comprising:

selecting a fixed parameter from parameters of a URL link extracted from a website;
   determining whether vulnerability determination has been completed for the selected fixed parameter;
   if the vulnerability determination has not been completed, inserting an attack pattern for each attack type to an input value for the selected fixed parameter; and
   determining, using the processor, vulnerability of the selected fixed parameter by each attack type through an analysis of response to an input of the URL link with the attack pattern inserted thereinto,
   wherein vulnerability determination comprises determining vulnerability of the selected fixed parameter by each attack type through an analysis of a response to an input of the URL link with the attack pattern inserted into the URL link.

13. A system of determining vulnerability of web application comprising:

a data storage medium;
   a fixed parameter selecting unit to select a fixed parameter from parameters of a URL link extracted from a website;
   a redundancy determining unit to determine whether vulnerability determination has been completed for the selected fixed parameter based on data stored in the data storage medium;
   an attack-pattern inserting unit to insert an attack pattern for each attack type to an input value for the fixed parameter if the vulnerability determination has not been completed; and
   a vulnerability determining unit to determine the vulnerability of the selected fixed parameter through an analysis of response to an input of the URL link with the attack pattern inserted thereinto,
   wherein vulnerability determination comprises determining vulnerability of the selected fixed parameter by each attack type through an analysis of a response to an input of the URL link with the attack pattern inserted into the URL link.

14. The system according to claim 13, further comprising a URL-link extracting unit to extract the URL link from a main webpage of the website to be determined, and to provide the extracted URL link to the fixed parameter selecting unit.

15. The system according to claim 13, wherein the fixed parameter selecting unit selects the parameter, positioned at the right of a parameter classification mark included in the URL link, as the fixed parameter.

16. The system according to claim 13, wherein the data storage medium comprises:

a first database for storing the attack pattern by each attack type; and
   a second database for storing information of the URL links which are used to complete the process of determining the vulnerability,
   wherein the attack-pattern inserting unit extracts the attack pattern from the first database, and inserts the extracted attack pattern into the input value for the fixed parameter selected.

17. The system according to claim 13, wherein the attack type includes at least one of SQL Injection, Blind SQL Injection and XSS (Cross-Site Scripting).

18. The system according to claim 13, further comprising a determining-result generating unit to generate results of determining vulnerability by mapping the fixed parameter to URL address of the website by each attack type to which the corresponding fixed parameter is determined to be vulnerable, when the vulnerability determining unit determines that the fixed parameter is vulnerable to the specific attack type.

19. The system according to claim 13, wherein the vulnerability determining unit determines the vulnerability of the fixed parameter based on the comparison of pre-stored result pattern of determining the vulnerability and HTTP response pattern to the input of URL link with the attack pattern inserted thereinto.

20. The system according to claim 13, further comprising a URL-link list generating unit to generate a URL-link list to be determined on vulnerability through the use of the extracted URL link, wherein the redundancy determining unit determines whether the process of determining the vulnerability for the fixed parameter included in the URL link recorded in the URL-link list is completed.

* * * * *